(12) United States Patent
Nakane

(10) Patent No.: US 8,335,149 B2
(45) Date of Patent: Dec. 18, 2012

(54) BCA RECORDING DEVICE FOR OPTICAL DISC, OPTICAL DISC REPRODUCING DEVICE, AND RECORDABLE OPTICAL DISC

(75) Inventor: Kazuhiko Nakane, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/139,946

(22) PCT Filed: Feb. 2, 2010

(86) PCT No.: PCT/JP2010/000604
§ 371 (c)(1),
(2), (4) Date: Jun. 15, 2011

(87) PCT Pub. No.: WO2010/098016
PCT Pub. Date: Sep. 2, 2010

(65) Prior Publication Data
US 2011/0255387 A1    Oct. 20, 2011

(30) Foreign Application Priority Data
Feb. 27, 2009   (JP) .................................. 2009-045886

(51) Int. Cl.
*G11B 7/00* (2006.01)
(52) U.S. Cl. ................................ 369/124.07; 369/53.22
(58) Field of Classification Search .................... None
See application file for complete search history.

(56) References Cited

U.S. PATENT DOCUMENTS

| 2003/0016603 | A1* | 1/2003 | Tomita ........................ 369/47.3 |
| 2005/0141379 | A1 | 6/2005 | Yamamoto et al. |
| 2005/0163009 | A1* | 7/2005 | Irie et al. ...................... 369/53.2 |
| 2007/0198794 | A1 | 8/2007 | Otsuka et al. |
| 2009/0046558 | A1* | 2/2009 | Ohkubo ........................ 369/100 |
| 2009/0073848 | A1* | 3/2009 | Kawaguchi et al. .......... 369/100 |

FOREIGN PATENT DOCUMENTS

| JP | 2002-133726 A | 5/2002 |
| JP | 2004-152429 A | 5/2004 |
| JP | 2005-190591 A | 7/2005 |
| JP | 2005-228437 A | 8/2005 |
| JP | 2005-276341 A | 10/2005 |
| JP | 2006-294247 A | 10/2006 |

* cited by examiner

*Primary Examiner* — Paul Huber
(74) *Attorney, Agent, or Firm* — Birch, Stewart, Kolasch & Birch, LLP

(57) ABSTRACT

A method for recording information which cannot be easily copied on a BCA is provided so as to prevent pirated copies from being made. The BCA recording device for optical discs records, on the BCA on an optical disc, identifying information unique to the optical disc. The BCA recording device is provided with: a BCA data generating section which generates BCA mark signals and BCA code signals which indicate the identifying information; a BCA mark generating section which, based on the BCA mark signals, generates BCA marks by recording marks on the recording film in the BCA on the optical disc, thereby partially changing the reflectance of the recording film; and a BCA code generating section which, based on the BCA code signals, generates BCA codes by partially removing the recording film on the BCA.

14 Claims, 6 Drawing Sheets

BCA RECORDING DEVICE FOR OPTICAL DISC, OPTICAL DISC REPRODUCING DEVICE, AND RECORDABLE OPTICAL DISC

This application is a 371 of PCT/JP2010/000604, filed Feb. 2, 2010.

TECHNICAL FIELD

The present invention relates to an optical disc for recording audio and video content data and to associated devices, in particular to a device for recording in the BCA provided at the inner circumference of a recordable optical disc.

BACKGROUND ART

In order to protect the copyrights of content providers, information recording media on which video content is recorded require a mechanism to prevent the illegitimate reproduction or use of the content. For this reason, in a technique applied to DVDs, an ID number unique to the disc is recorded and the ID number is used to encrypt the content data.

As a method of recording the unique ID number of a disc, a technique has been proposed (see Patent Document 1) in which a barcode formation area is provided on the inner circumferential side of a reproduce-only (ROM) disc, and part of the reflective film is selectively removed by laser trimming from the finished ROM disc to form a barcode. This barcode formation area is known as the BCA (Burst Cutting Area). Proposed techniques for preventing illegitimate copying of the BCA include the embedding of secret information in the area by changing the locations of the marks constituting the BCA within their tolerance range (see Patent Document 2), and disabling BCA recording by producing degenerative changes in the disc (see Patent Document 3).

In recent years, systems have been put into practice in which content is delivered via a network and users record the received content on recordable optical discs. The recordable optical discs used in these systems also have an ID number unique to each disc recorded by use of the BCA, and the received content data are encrypted by use of the unique ID number of the disc before being recorded on the disc. After recording, even if the content data written on the disc are copied faithfully onto another disc, the data will not be decrypted correctly if the other disc has a different ID number, so the reproducing of illegitimately copied discs can be prevented.

However, if BCA recording is too easy, there remains a risk that the BCA may be copied. If the BCA is copied and the content data are copied bit-by-bit, the disc can be reproduced correctly by using the ID number recorded in the copied BCA. Accordingly, if the BCA can be easily copied by use of, for example, an optical head used for recording user data, there is a high risk that the manufacture of pirated copies will also be easy. Since the illegitimately copied pirated discs are clone discs carrying exactly the same information as the original disc, they cannot be distinguished from genuine discs with legitimately written information, and copyright protection technology cannot keep them from being reproduced.

One conceivable way to prevent the manufacture of pirated copies is to make BCA recording more difficult by the use of special equipment. The special equipment uses high-power laser trimming to effect a partial removal of the recording film, as on a reproduce-only optical disc. However, even if the identifying information is recorded on the BCA by partially removing the recording film in this way, there are recordable optical discs using reflectance reducing recording films, the reflectance of which is reduced when a mark is recorded in the BCA, so recorded marks also show reduced reflectance. FIG. 6 shows the reflectance distribution of the BCA on a recordable optical disc using a reflectance reducing recording film. The reflectance is reduced both where marks are recorded and where the recording film is removed, so depending on the reproduced signal level, recorded marks may be indistinguishable from places from which the recording film has been removed. This allows the use of recorded marks to mimic the BCA pattern formed by removing the recording film, making it difficult to prevent the manufacture of pirated copies.

PRIOR ART REFERENCES

Patent Documents

Patent document 1: Japanese Patent Application Publication No. 2006-294247
Patent document 2: Japanese Patent Application Publication No. 2005-228437
Patent document 3: Japanese Patent Application Publication No. 2002-133726

SUMMARY OF THE INVENTION

Problem to be Solved by the Invention

An object of the present invention is to provide a BCA recording method that renders copying difficult so as to prevent pirated copies from being made.

Means for Solving the Problem

A BCA recording device for an optical disc is, according to the present invention, a BCA recording device for recording identifying information unique to the optical disc on a BCA of the optical disc, comprising:

a BCA data generating section for generating BCA mark signals and BCA code signals representing the identifying information;

a BCA mark generating section for creating BCA marks based on the BCA mark signals by recording marks on a recording film in the BCA of the optical disc, thereby partially varying the reflectance of the recording film; and a BCA code generating section for creating BCA codes based on the BCA code signals by partially removing the recording film in the BCA.

Effects of the Invention

The BCA recording device in the optical disc according to the present invention uses BCA marks formed by partially changing the reflectance of the recording film in the BCA and BCA codes formed by partially removing the recording film in the BCA to record the identifying information unique to the optical disc in the BCA, which makes it difficult to copy the BCA, thereby preventing the manufacture of illegitimately copied discs such as pirated copies.

Figure 1:
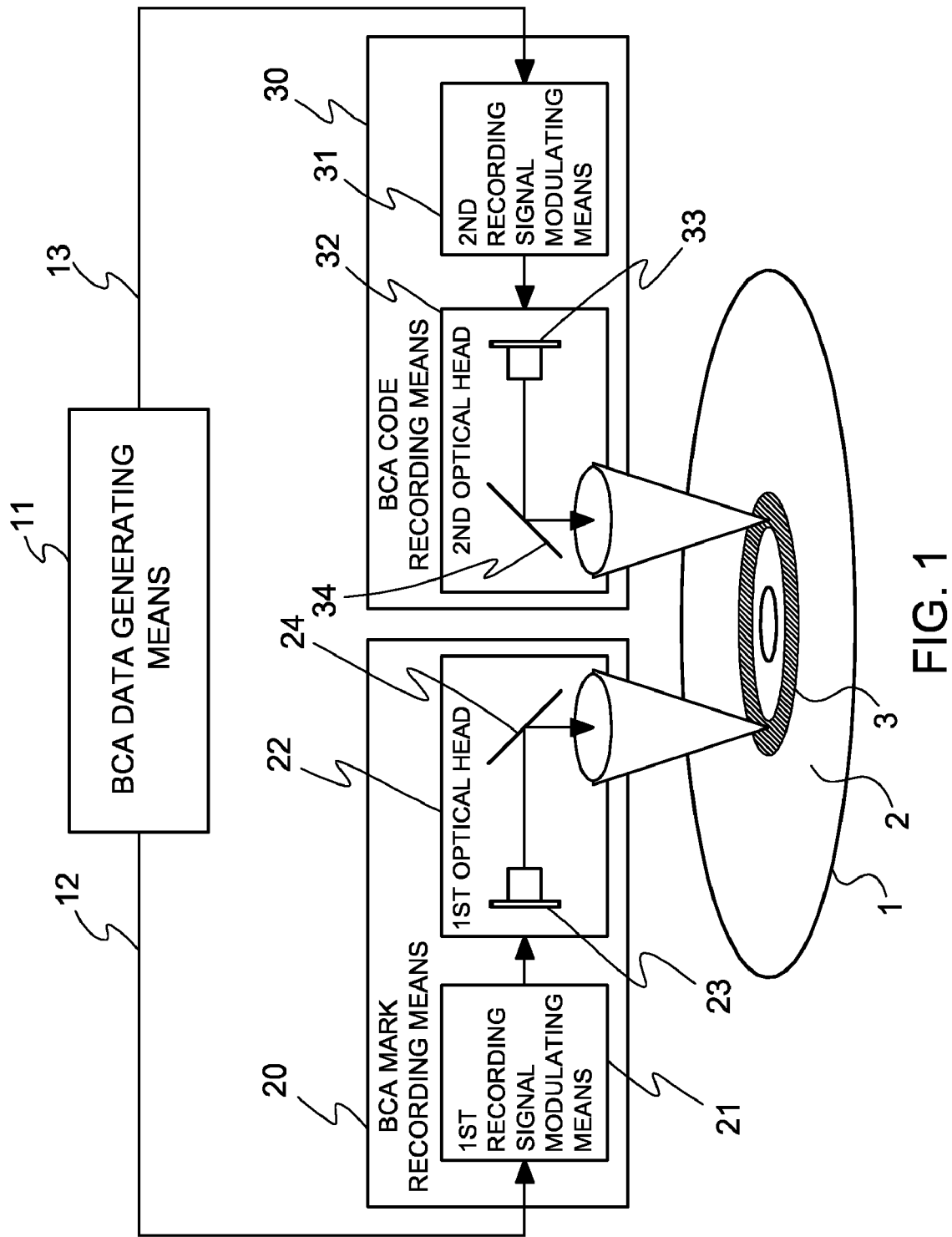
FIG. 1 illustrates the structure of a BCA recording device according to an embodiment of the present invention.

REFERENCE CHARACTERS 1 recordable optical disc, 2 data area, 3 BCA, 11 BCA data generating means, 12 BCA mark signals, 13 BCA code signals, 14 BCA reproduced signal, 15 BCA reproduced data signal, 20 BCA mark recording means, 21 first recording signal modulating means, 22 first optical head, 23 first laser light source, 24 first optical system, 25 first light beam, 30 BCA code recording means, 31 second recording signal modulating means, 32 second optical head, 33 second laser light source, 34 second optical system, 35 second light beam, 40 BCA reproducing means, 41 third optical head, 43 third laser light source, 44 third optical system, 45 third light beam, 46 light detector, 47 BCA reproduced signal detection means, and 48 BCA data decision means.

MODE FOR CARRYING OUT THE INVENTION

First Embodiment

An embodiment of a BCA recording device according to the present invention is shown in FIG. 1. The BCA recording device shown in FIG. 1 turns a recordable optical disc 1 by means of a disc motor (not shown) and writes identifying information unique to the disc in its BCA 3. The BCA 3 of the recordable optical disc 1 is an annular area disposed at the innermost circumference, farther inward than the data area 2.

The recording film of the recordable optical disc 1 according to this embodiment uses a reflectance increasing material with a reflectance that increases where a mark is recorded. If a mark is written into the BCA 3 with an appropriate recording power, then when the mark is reproduced, the reflected light intensity is higher than before the mark was recorded, thus higher than where nothing is recorded. A mark written in the BCA 3 will be referred to as a BCA mark. When the BCA 3 is illuminated with a recording power exceeding a certain level, the recording film is burned off and the reflectance is reduced, so that when the burned-off area is reproduced, the reflected light intensity is lower than before recording. The section that is written into the BCA 3 in this way will be referred to as a BCA code. Since much more power is required to burn off the recording film than to record ordinary data, an optical head having a special high-power output laser light source is used.

In this invention, BCA marks and BCA codes are used in combination to modulate the reflectance of the BCA 3, and identifying information unique to the disc can be expressed by the reflectance modulation pattern. The BCA 3 has a 1-mm wide annular shape; the BCA marks and BCA codes extend as straight lines or narrow fan shapes in the radial direction of the disc.

As described above, a BCA recording device according to the invention expresses the identifying information unique to a disc by BCA marks and BCA codes. For each disc, the BCA data generating means 11 generates BCA data corresponding to the disc's unique identifying information represented by the BCA marks and BCA codes. The identifying information makes each recordable optical disc 1 identifiable; it includes a number unique to the disc, a number indicating the disc manufacturer or manufacturing site, a number indicating the distributor or distribution channel, information about the recorded content and its provider, etc.

Based on the BCA data, the BCA data generating means 11 outputs BCA mark signals 12 for recording the BCA marks to a BCA mark recording means 20, and BCA code signals 13 for recording the BCA codes to a BCA code recording means 30.

A first recording signal modulating means 21 in the BCA mark recording means 20 receives the BCA mark signals 12, generates a signal that controls the recording power for writing BCA marks onto the BCA 3, and outputs this signal to a first optical head 22. Based on the input control signal, the first optical head 22 controls the output power of a first laser light source 23. The output light from the first laser light source 23 is focused by a first optical system 24 onto the recordable optical disc 1.

Similarly, a second recording signal modulating means 31 in the BCA code recording means 30 receives the BCA code signals 13, generates a signal that controls the recording power for writing BCA codes onto the BCA 3, and outputs this signal to a second optical head 32. Based on the input control signal, the second optical head 32 controls the output power of a second laser light source 33. The output light from the second laser light source 33 is focused by a second optical system 34 onto the recordable optical disc 1.

In the BCA recording device shown in FIG. 1, the BCA mark recording means 20 and the BCA code recording means 30 are disposed facing each other over the recordable optical disc 1, but the actual disposition is not limited to this arrangement.

Figure 2:
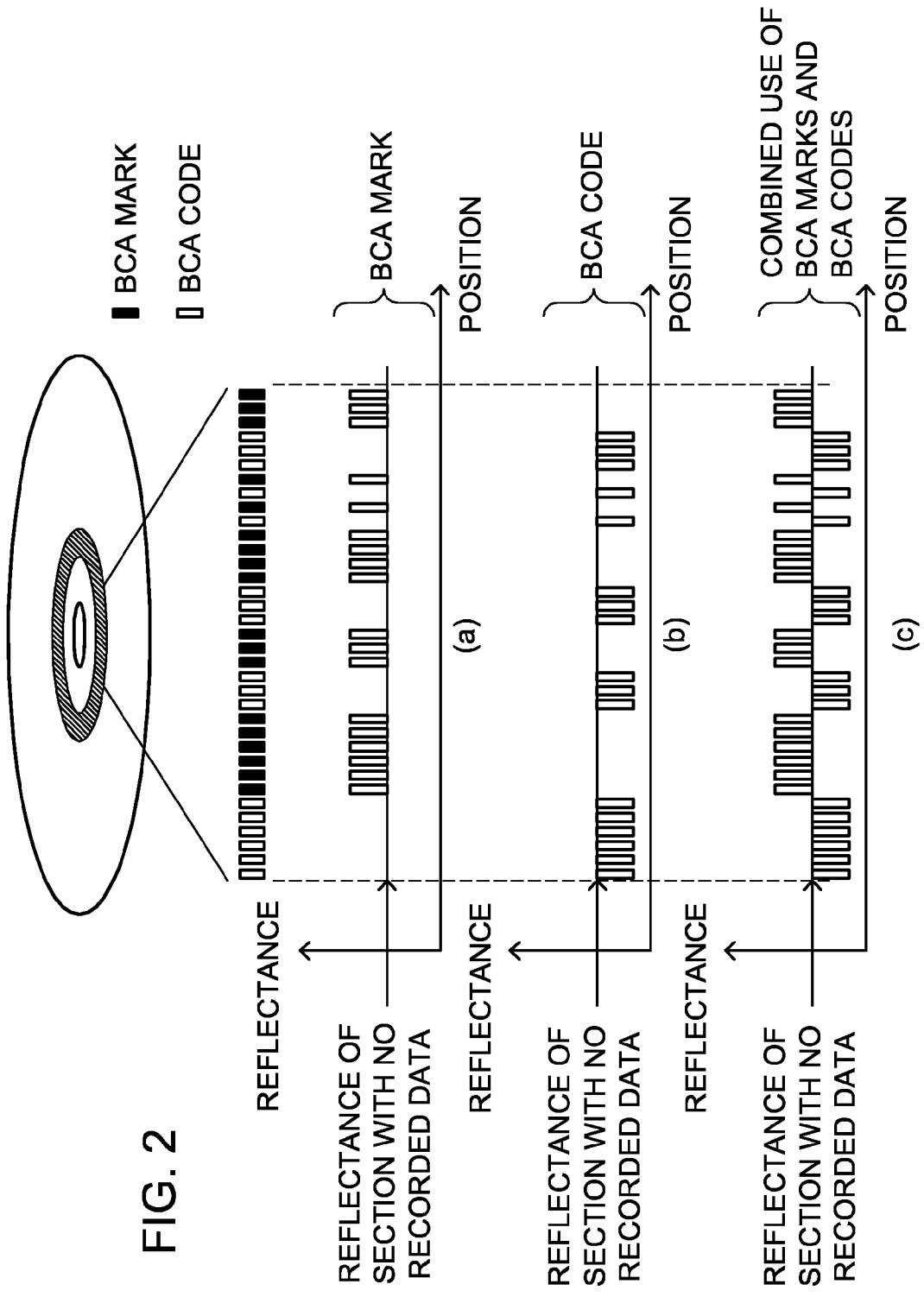
FIG. 2 illustrates an exemplary reflectance distribution in the BCA on a recordable optical disc according to an embodiment of the present invention.

FIG. 2 shows an example of the reflectance distribution of a BCA 3 on which recording has been performed by the BCA recording device shown in FIG. 1. FIG. 2 shows the reflectance distribution of the BCA marks (a) and BCA codes (b) recorded on a recordable disc using a reflectance increasing recording film, and the reflectance distribution (c) of the BCA 3 in which these BCA marks and BCA codes are recorded to indicate the unique identifying information of the disc.

In a reflectance increasing recording film, because of the increased reflectance, the reflected light intensity increases in places where BCA marks are recorded (a). In contrast, the reflected light intensity decreases in places where BCA codes are recorded (b), because the recording film is burned off and the reflectance is reduced. It is therefore possible to discriminate between BCA marks and BCA codes by the reproduced signal level. A reproducing device can thus recognize the identifying information recorded by use of the BCA marks and BCA codes (c).

As shown at bottom (c) in FIG. 2, the BCA recording device according to the invention represents the identifying information unique to a disc by using BCA marks having a reflectance higher than the reflectance of sections with no recorded data, and BCA codes having a reflectance lower than the reflectance of sections with no recorded data. Accordingly, the scheme of using a disc having a reflectance decreasing recording film to mimic a BCA formed by burning off the recording film does not work. Copying of the BCA therefore becomes difficult, preventing the manufacture of illegitimately copied discs.

The BCA recording device described above performs BCA recording on a reflectance increasing recordable disc in which marks have increased reflectance. However, the BCA recording device according to the invention may also be applied to a reflectance decreasing recordable optical disc, provided it is possible to discriminate clearly between the reflectance of marks and the reduced reflectance of sections in which the recording film is removed. That is, the reduced reflectance of sections in which the recording film is removed must be lower than, or higher than, the reflectance of marks, and the difference in reflectance must be distinguishable.

Performing BCA recording by means of BCA codes and BCA marks dramatically increases the amount of data that can be recorded in the BCA. This also enables a significant increase in the size of the disc identifying information. This large amount of identifying information can be used for purposes other than preventing illegitimate copying of the BCA.

Second Embodiment

Figure 3:
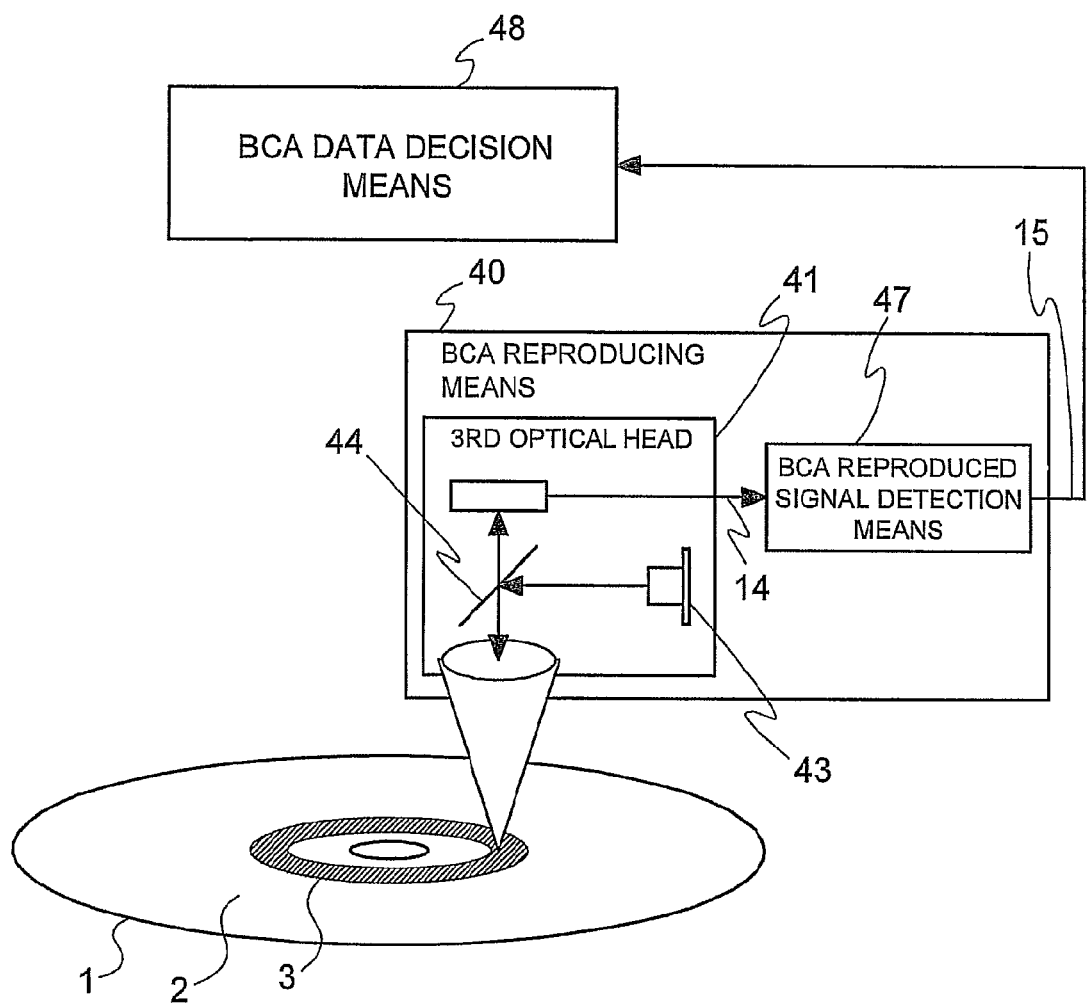
FIG. 3 illustrates the structure of an optical disc reproducing device according to an embodiment of the present invention.

FIG. 3 illustrates the configuration of a reproducing device for reproducing a recordable optical disc 1 having a BCA recorded by the BCA recording device according to the first embodiment. The reproducing device shown in FIG. 3 turns the recordable optical disc 1 by means of a disc motor (not shown) while a third optical head 41 provided in a BCA reproducing means 40 accesses the BCA 3, thereby reproducing information recorded in the BCA 3.

The third optical head 41 uses a third optical system 44 to focus a reproducing laser beam output from a third laser light source 43 onto the BCA 3 of the recordable optical disc 1, and a light detector 46 receives the reflected light through the third optical system 44. The BCA reproduced signal 14 detected by the light detector 46 is sent to a BCA reproduced signal detection means 47. The BCA reproduced signal detection means 47 discriminates between BCA marks and BCA codes in the BCA reproduced signal 14 and generates a BCA data signal 15. The BCA data signal 15 is sent to a BCA data decision means 48 as the reproduced signal of the BCA data representing the disc's unique identifying information, which consists of BCA marks and BCA codes.

The BCA reproduced signal detection means 47 detects the identifying information unique to the disc from the BCA reproduced signal 14. The BCA data decision means 48 proceeds to reproduction or other operations on the recordable optical disc 1 only when it decides that the detected identifying information is proper identifying information. In this way, whether the optical disc is a legitimate version of the disc or a pirated copy is determined, and if it is a pirated copy, reproduction is inhibited, whereby the copyright of the content can be effectively protected.

Figure 4:
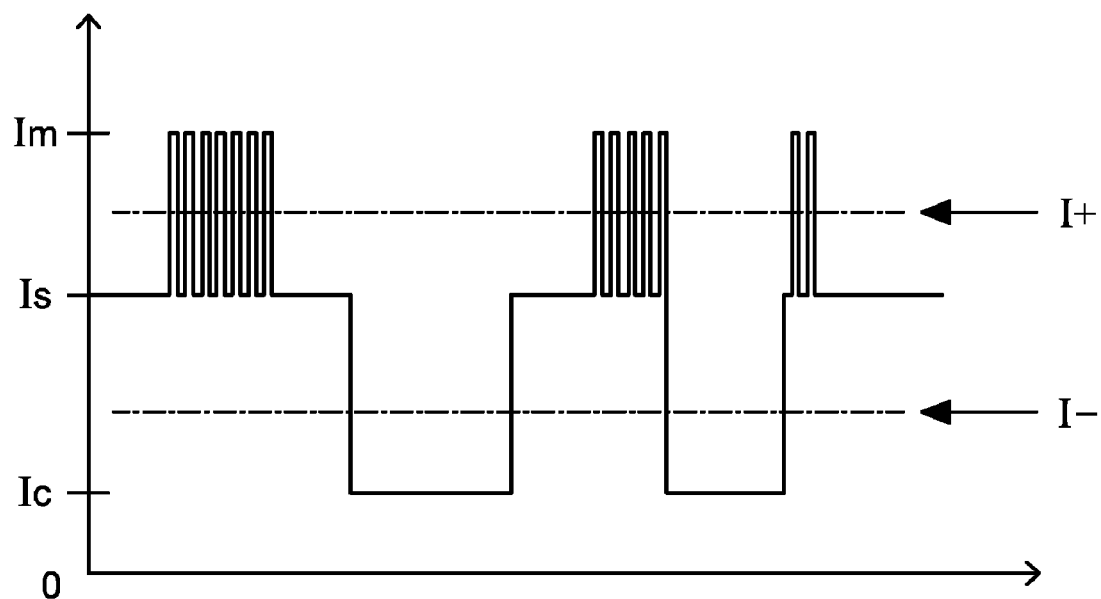
FIG. 4 illustrates the signal reproduced from the BCA on a recordable optical disc according to an embodiment of the present invention.

FIG. 4 illustrates the BCA reproduced signal recorded by the BCA recording device according to the invention. The BCA reproduced signal shown in FIG. 4 is input to the BCA reproduced signal detection means 47. In FIG. 4, Im indicates the reflected light intensity in sections in which BCA marks are recorded, Is indicates the reflected light intensity in sections with no recorded data, and Ic indicates the reflected light intensity in sections in which BCA codes are recorded. Of these reflected light intensities, Im is the highest, Ic is the lowest, and Is is intermediate between Im and Ic.

In the BCA reproduced signal detection means 47, two decision levels, I+ and I−, are set as shown in FIG. 4 for detecting BCA marks and BCA codes, respectively; sections in which the reproduced signal level is I+ or greater are recognized as BCA marks; sections in which the reproduced signal level is I− or less are recognized as BCA codes; sections in which the reproduced signal level is greater than I− but less than I+ are recognized as sections with no recorded data. BCA marks and BCA codes are thereby recognized independently, enabling correct detection of the identifying information unique to the disc.

Third Embodiment

In reproducing a recordable optical disc having a BCA recorded by the BCA recording device according to the invention, it is necessary to discriminate accurately between BCA marks and BCA codes. If BCA marks and BCA codes cannot be discriminated accurately, it is impossible to detect the identifying information unique to the disc, and accordingly to reproduce the content recorded on the optical disc. In particular, since BCA codes are formed by removing the recording film, it is not possible to write a BCA mark where a BCA code has been formed. Therefore, the BCA marks and BCA codes must be deployed in a positional relationship such that they will not be misrecognized during reproduction.

Since a BCA code is recorded by removal of the recording film by use of a high power laser light source, the recording density of the BCA code is lower than the recording density when data are recorded using recording marks. For example, while the minimum recording mark length in a DVD is normally approximately 0.4 the BCA code length is approximately 10 about twenty-five times the recording mark length. This relationship does not vary greatly in Blu-ray discs. Thus BCA marks, which are formed by use of recording marks, can be recorded at the same high density as ordinary data.

Figure 5:
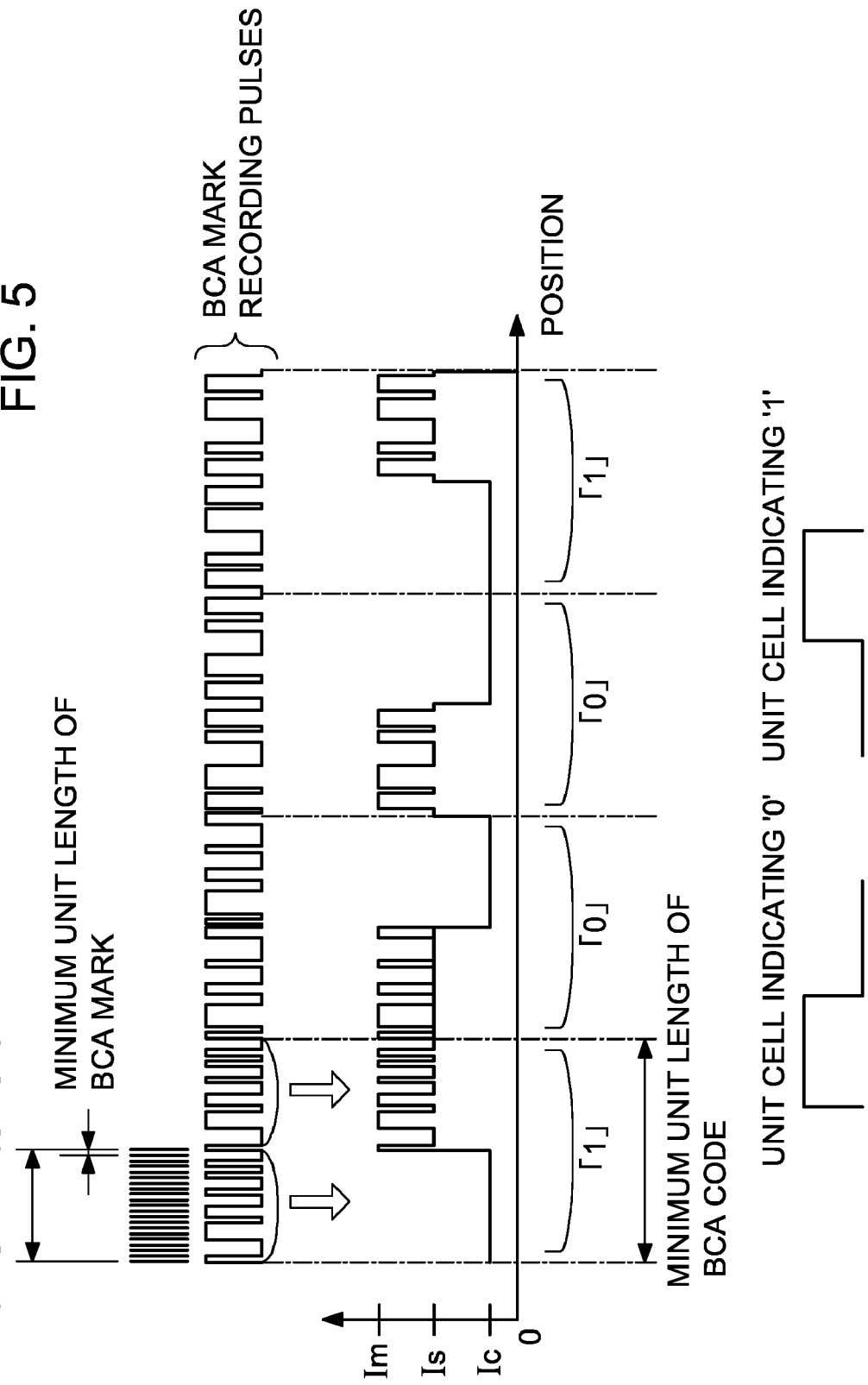
FIG. 5 schematically illustrates a BCA mark and code deployment scheme according to an embodiment of the invention.
Figure 6:
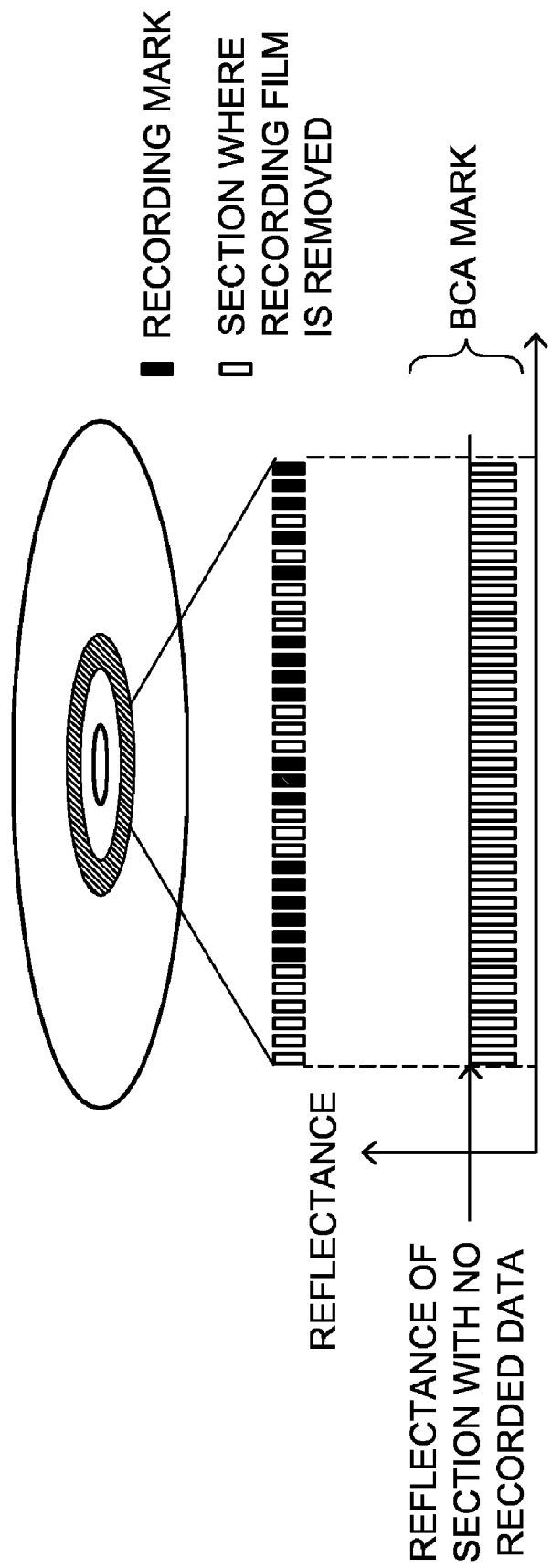
FIG. 6 illustrates an exemplary reflectance distribution in the BCA on a recordable optical disc using a reflectance reducing recording film.

A deployment scheme for the BCA marks and BCA codes that takes their characteristics into consideration will now be described. FIG. 5 illustrates the deployment scheme of the BCA marks and BCA codes. In FIG. 5, phase modulation is used as the encoding system of the BCA codes. In this drawing, the minimum unit length of the BCA code indicates one bit of BCA code information, the reflectance decreasing in the center of a unit cell indicating a '0' and increasing in the center of a unit cell indicating a '1'. That is, the recording film is removed from the back half of a unit cell indicating a '0', and from the front half of a unit cell indicating a '1'. The BCA codes shown in FIG. 5 indicate a '1', '0', '0', '1' bit sequence, with BCA marks overwritten on the BCA codes.

Level modulation is used in FIG. 5 as the BCA mark encoding system. It is assumed here that the minimum unit length of the BCA mark indicates one bit of BCA mark information, and a prescribed number of BCA mark bits form a BCA mark information unit. In the example shown in FIG. 5, the BCA mark information unit consists of twenty BCA mark bits. As shown in the drawing, the bit value corresponds to the reflectance level in such a way that the reflectance level of a '0' BCA mark is Is and the reflectance level of a '1' BCA mark is Im. The first BCA mark information unit in FIG. 5 indicates the bit values '10001110110010010100'.

In the BCA code phase modulation system shown in FIG. 5, the proportions of the area in which the recording film remains and the reflectance level is Is and the area in which the recording film is removed and the reflectance level is Ic are always 50 percent. In other words, the recording film is present in either the front half or back half of the unit cell. The reason for this is that if the proportion of the areas in which the recording film is removed and the reflectance level is reduced is too high, the amount of reflected light becomes inadequate, making it difficult to maintain servo control of the spot on the disc surface illuminated by the light beam for reproducing the optical disc. Accordingly, if a modulation system other than phase modulation is used, it is still necessary to adjust the reflectance level proportions so as to assure a certain amount of reflected light.

As shown in FIG. 5, a BCA mark information unit is recorded twice in succession in alignment with a BCA code unit cell. This assures that the whole BCA mark information unit is recorded in either the front half or back half of the unit cell. To avoid having the recorded BCA mark overlap the BCA code section from which the recording film is removed, a necessary margin may be provided before and after each BCA mark information unit.

The BCA recording device described in the first embodiment records the BCA data on the BCA 3 by scanning the recording light beam in the radial direction over each section in which a BCA mark or BCA code is recorded, while turning the recordable optical disc 1 at a low speed. The recording surface of the BCA 3 on the recordable optical disc 1 is a flat mirror surface and does not have the recording track structure provided in the user data area. Accordingly, in BCA recording, the accuracy of control of the position of the beam spot of the light directed onto the disc surface depends on the accuracy of the mechanism (motor etc.) that turns the disc, the accuracy of the mechanisms that move the optical heads in the radial direction over the disc, and the accuracy of the optical beam focal positions as controlled by the optical systems in the optical heads. Accordingly, the arrangement of the BCA marks and BCA codes, especially, the lengths of the necessary margins before and after each BCA mark information unit, must be designed in consideration of the accuracy of these parts of the BCA recording device.

This arrangement of the BCA marks and BCA codes enables each bit of BCA mark and BCA code information to be reliably recorded and reproduced. Although level modulation is used here as the BCA mark encoding system, the NRZI modulation system is also applicable. As for the recording order of the BCA marks and BCA codes, the BCA codes are recorded first in the description above, but the BCA marks may be written first, depending on the control characteristics of the BCA mark recording means 20 and BCA code recording means 30. Whether to record the BCA marks or BCA codes first is a design choice that may be made according to device characteristics.

Furthermore, in order to record the BCA marks with a higher density, it is possible to provide a track structure on the BCA recording surface and scan the BCA mark-recording light beam spot over the tracks to record the BCA marks. In this case, it is necessary to align the positions of the BCA marks recorded on the tracks in the radial direction, so a structure giving precise positional information in the circumferential direction of the tracks must be provided. The BCA marks must be recorded first in this case, before the recording of the BCA codes makes it impossible to detect the track structure.

What is claimed is:

1. A BCA recording device for recording identifying information unique to an optical disc on a BCA of the optical disc, comprising:
   a BCA data generating section for generating BCA mark signals and BCA code signals, a combination of the BCA mark signals and the BCA code signals representing the identifying information;
   a BCA mark generating section for creating BCA marks based on the BCA mark signals by recording marks on a recording film in the BCA of the optical disc, thereby partially increasing a reflectance of the recording film; and
   a BCA code generating section for creating BCA codes based on the BCA code signals by partially removing the recording film in the BCA.

2. The BCA recording device of claim 1, wherein the BCA mark generating section has a first light source for illuminating the recording film in the BCA with laser light to form the marks; and
   the BCA code generating section has a second light source for illuminating the recording film in the BCA with laser light to remove the recording film.

3. A BCA recording method for recording identifying information unique to an optical disc on a BCA of the optical disc, comprising:
   generating BCA mark signals and BCA code signals, a combination of the BCA mark signals and the BCA code signals representing the identifying information;
   creating BCA marks based on the BCA mark signals by recording marks on a recording film in the BCA of the optical disc, thereby partially increasing a reflectance of the recording film; and
   creating BCA codes based on the BCA code signals by partially removing the recording film in the BCA.

4. A recordable optical disc having an inner circumference with a BCA in which BCA marks and BCA codes are recorded, a combination of the BCA marks and the BCA codes representing identifying information unique to the recordable optical disc wherein:
   the BCA marks are formed by recording marks on a recording film in the BCA to thereby partially increase a reflectance of the BCA; and
   the BCA codes are formed by partially removing the recording film in the BCA.

5. The recordable optical disc of claim 4, wherein the recording film of the BCA has one reflectance, the BCA marks have a different reflectance, and sections of the BCA from which the recording film is removed have a still different reflectance.

6. The recordable optical disc of claim 5, wherein the reflectance of the recording film of the BCA is in between the reflectance of the BCA marks and the reflectance of the BCA codes.

7. An optical disc reproducing device for reproducing the recordable optical disc of claim 4, comprising:
   a light detector for receiving reflected laser light from the BCA of the recordable optical disc and using the reflected laser light to generate a BCA reproduced signal; and
   a BCA reproduced signal detection section for detecting the unique identifying information of the recordable optical disc by detecting a signal corresponding to the BCA marks and, independently, a signal corresponding to the BCA codes from the BCA reproduced signal.

8. The optical disc reproducing device of claim 7, wherein the BCA reproduced signal detection section has a first decision level for detecting the signal corresponding to the BCA marks and a second decision level for detecting the signal corresponding to the BCA codes, and compares the BCA reproduced signal with the first and second decision levels to detect the identifying information.

9. The optical disc reproducing device of claim 8, wherein the recording film of the BCA has one reflectance, the BCA marks have a different reflectance, and sections of the BCA from which the recording film is removed have a still different reflectance.

10. The optical disc reproducing device of claim 9, wherein the reflectance of the recording film of the BCA is in between the reflectance of the BCA marks and the reflectance of the BCA codes.

11. An optical disc reproducing method for reproducing the recordable optical disc of claim 4, comprising:

receiving reflected laser light from the BCA of the recordable optical disc and using the reflected light to generate a BCA reproduced signal; and detecting a signal corresponding to the BCA marks and, independently, a signal corresponding to the BCA codes from the BCA reproduced signal, thereby detecting the unique identifying information of the recordable optical disc.

12. The optical disc reproducing method of claim 11, wherein a first decision level for detecting the signal corresponding to the BCA marks and a second decision level for detecting the signal corresponding to the BCA codes are set, and the identifying information is detected by comparing the BCA reproduced signal with the first and second decision levels.

13. The optical disc reproducing method of claim 12, wherein the recording film of the BCA has one reflectance, the BCA marks have a different reflectance, and sections of the BCA from which the recording film is removed have a still different reflectance.

14. The optical disc reproducing method of claim 13, wherein the reflectance of the recoding film of the BCA is in between the reflectance of the BCA marks and the reflectance of the BCA codes.

* * * * *